United States Patent
Kaewkamnerdpong et al.

(10) Patent No.: US 10,864,453 B2
(45) Date of Patent: Dec. 15, 2020

(54) AUTOMATIC MOBILE ROBOT FOR FACILITATING ACTIVITIES TO IMPROVE CHILD DEVELOPMENT

(71) Applicant: King Mongkut's University of Technology Thonburi, Bangkok (TH)

(72) Inventors: Boonserm Kaewkamnerdpong, Bangkok (TH); Wisanu Jutharee, Bangkok (TH); Settapon Santatiwongchai, Bangkok (TH)

(73) Assignee: KING MONGKUT'S UNIVERSITY OF TECHNOLOGY THONBURI, Bangkok (TH)

( * ) Notice: Subject to any disclaimer, the term of this patent is extended or adjusted under 35 U.S.C. 154(b) by 0 days.

(21) Appl. No.: 16/087,502

(22) PCT Filed: Mar. 21, 2017

(86) PCT No.: PCT/TH2017/000023
§ 371 (c)(1),
(2) Date: Sep. 21, 2018

(87) PCT Pub. No.: WO2017/164825
PCT Pub. Date: Sep. 28, 2017

(65) Prior Publication Data
US 2019/0270026 A1    Sep. 5, 2019

(30) Foreign Application Priority Data
Mar. 21, 2016    (TH) .................................. 1601001595

(51) Int. Cl.
*A63H 33/00* (2006.01)
*B25J 11/00* (2006.01)
(Continued)

(52) U.S. Cl.
CPC ........... *A63H 33/005* (2013.01); *A63H 3/365* (2013.01); *B25J 11/0015* (2013.01);
(Continued)

(58) Field of Classification Search
CPC .......... A63H 3/365; A63H 3/48; A63H 17/00; A63H 17/004; A63H 17/28; A63H 33/005; A63H 2200/00; B25J 11/0015
See application file for complete search history.

(56) References Cited

U.S. PATENT DOCUMENTS

| 4,642,710 A | * | 2/1987 | Murtha | ................ | G11B 25/063 |
| | | | | | 340/815.46 |
| 6,038,493 A | * | 3/2000 | Tow | ....................... | G06N 3/008 |
| | | | | | 700/248 |

(Continued)

FOREIGN PATENT DOCUMENTS

| CN | 102820390 | 5/2011 |
| CN | 102642576 | 8/2012 |

(Continued)

OTHER PUBLICATIONS

Werry, et al., "Evaluating the Response of Children with Autism to a Robot," In Proceedings of Rehabilitation Engineering and Assistive Technology Society of North America (2001).
(Continued)

*Primary Examiner* — Eugene L Kim
*Assistant Examiner* — Alyssa M Hylinski
(74) *Attorney, Agent, or Firm* — Innovation Capital Law Group, LLP; Vic Lin

(57) ABSTRACT

An automatic mobile robot for facilitating activities to improve both neurotypical and autistic children's intellectual and emotional development is disclosed. The mobile robot has a non-humanoid toy shape but includes an expressive face perceived as friendly and approachable by autistic (Continued)

children. The mobile robot is durable and safe for children. It includes auto-play, game, and occupational therapy modes, each of which may be used by a one or more child users at a time. Games and therapeutic activities may be customized to suit each child user's developmental level. The mobile robot includes multiple sensors and components configured to process and express emotion in response to data received from the sensing units and the patterns of child users' interactions with the robot. The robot is programmed to show only limited amounts of negative behavior or emotions to children so that the children do not become afraid and decide not to interact with the robot.

20 Claims, 2 Drawing Sheets

(51) Int. Cl.
*A63H 3/36* (2006.01)
*G05D 1/00* (2006.01)
*G09B 5/06* (2006.01)

(52) U.S. Cl.
CPC .............. *G05D 1/0011* (2013.01); *G09B 5/06* (2013.01); *A63H 2200/00* (2013.01)

(56) References Cited

U.S. PATENT DOCUMENTS

| | | | |
|---|---|---|---|
| 6,238,262 B1* | 5/2001 | Pracas | A63H 3/28 446/301 |
| 6,558,225 B1* | 5/2003 | Rehkemper | A63H 3/003 40/448 |
| 6,802,757 B1* | 10/2004 | Sejnowski | A63H 33/006 446/175 |
| 7,442,107 B1* | 10/2008 | Ueda | A63H 11/20 446/175 |
| 7,446,664 B2 | 11/2008 | White | |
| 8,662,955 B1* | 3/2014 | Fai | A63H 13/02 446/337 |
| 8,702,515 B2 | 4/2014 | Weston et al. | |
| 8,740,623 B2 | 6/2014 | Walker et al. | |
| 9,782,648 B2* | 10/2017 | DeCarlo | F41J 5/02 |
| 9,829,882 B2* | 11/2017 | MacGregor | B60K 1/04 |
| 2002/0019193 A1* | 2/2002 | Maggiore | A63H 3/48 446/337 |
| 2007/0172802 A1 | 7/2007 | Adams et al. | |
| 2007/0178804 A1* | 8/2007 | Hippely | A63H 17/266 446/465 |
| 2007/0192910 A1* | 8/2007 | Vu | G05D 1/0274 700/245 |
| 2008/0050999 A1* | 2/2008 | Jang | A63H 13/005 446/337 |
| 2008/0113323 A1 | 5/2008 | McElhoe | |
| 2009/0203294 A1 | 8/2009 | Kessin | |
| 2012/0142250 A1* | 6/2012 | Andersen | A63H 13/005 446/321 |
| 2013/0078600 A1* | 3/2013 | Fischer | G09B 19/00 434/236 |
| 2013/0154980 A1* | 6/2013 | Byrnes | G06F 3/01 345/173 |
| 2014/0249676 A1* | 9/2014 | Florencio | G06N 3/008 700/259 |
| 2014/0295731 A1 | 10/2014 | Weston | |
| 2015/0111185 A1 | 4/2015 | Laroche et al. | |
| 2015/0375130 A1* | 12/2015 | Cannon | A63H 33/005 446/454 |
| 2016/0375578 A1* | 12/2016 | Zhu | B25J 9/163 700/253 |

FOREIGN PATENT DOCUMENTS

| | | |
|---|---|---|
| CN | 102673673 | 9/2012 |
| CN | 203909616 | 10/2014 |
| CN | 105108758 | 2/2015 |
| KR | 20150020875 | 2/2015 |

OTHER PUBLICATIONS

Dautenhahn, K., et al., "Towards Adaptive Autonomous Robots in Autism Therapy: Varieties of Interactions", In Proceeds of IEEE International Symposium on Computational Intelligence in Robotics and Automation (577-582) (2003).

Diehl, J., et al., "The clinical use of robots for individuals with Autism Spectrum Disorders: A critical review," Research in Autism Spectrum Disorders Chicago, 6(1): 249-262 (2012).

Dautenhahn, K., et al., "Games Children with Autism can Play with Robots, a Humanoid Robotic Doll," In Proceedings of the 1$^{st}$ Cambridge Workshop on Universal Access and Assistive Technology (CWUAAT) 19:179-190 (2002).

Costa, S., "Robots as Tools to Help Children with ASD to Identify Emotions," Autism 4:e120 (2014).

Rabbitt, et al., "Integrating Socially Assistive Robotics Into Mental Healthcare Interventions: Applications and Recommendations for Expanded Us" Clinical Psychology Review 35:35-46 (2015).

International Search Report for PCT/TH2017/000023, entitled: Automatic Mobile Robot for Facilitating Activities to Improve Child Development, dated Sep. 13, 2017.

* cited by examiner

AUTOMATIC MOBILE ROBOT FOR FACILITATING ACTIVITIES TO IMPROVE CHILD DEVELOPMENT

This application is the U.S. National Stage of International Application No. PCT/TH2017/000023, filed Mar. 21, 2017, which designates the U.S., published in English, and claims priority under 35 U.S.C. § 119 or 365(c) to Thailand Application No. 1601001595, filed Mar. 21, 2016. The entire teachings of the above applications are incorporated herein by reference.

TECHNICAL FIELD

Engineering related to robotics

BACKGROUND

With the current trend of the increasing life expectancy and decreasing birth rate, the impact of our ageing society on everyday life is inevitable. The 2007 census report in Thailand showed that Thailand has more elderly people and that the ratio between the elderly population and the child population has been continuing to increase. These findings show that Thailand has already become an ageing society. The elderly population in 2007 was about 7 million, almost half of the child population, which was 14.7 million. These children will grow up and become the country's workforce. Two of these children will work not only to support themselves but also to support an elder: Comparing the census reports of 1994 and 2002 indicates that the proportion of elderly may potentially be increasing in the future. Hence, not only must the quality of life of the elderly population be maintained, but we also need to strengthen child development for a healthy ageing society.

Since computer technology has developed and become widely used, computers and information technology are employed in child development. For example, computer assisted instruction (CAI) was introduced to help learners understand better. Later, interactive multimedia was used to facilitate learning through multiple senses and give and receive feedback on learning. The use of technology to develop learning can also be found in many forms. Through communication networks, learners from anywhere can learn what they want to know at any time. Although information and communication technology (ICT) has played an important role in helping people learn effectively, learning through ICT is mostly focused on developing knowledge and skills related to generic intelligence. Skills for emotional intelligence, which is crucial for social interaction and allowing people from different backgrounds to work together peacefully, seem missing. If children develop both generic and emotional intelligence, they may grow and become an effective workforce to lead the country forward.

Some children are affected by autism spectrum disorder (ASD), which is a broad spectrum neurological condition and developmental disorder. Children with autism have difficulties in communication and social interaction. In addition, autistic children often exhibit repetitive behaviors. In 2012, Thailand's Department of Mental Health reported that there were about 370,000 autistic people in Thailand. In 2010, the U.S. found that 1 in 68 children under the age of 8 have autism. The prevalence of autism is increasing. The symptoms of autism can be detected before a child is 3 years old. Currently, the cause of autism is still undetermined and there is no cure. Treatment for autism spectrum disorders is to provide interventions to improve an autistic's abilities in social communication, social interaction and imagination to a level close to that of neurotypical children so that they can live comfortably with other people in society. In some cases, children with autism have special potential, e.g. excellence in mathematics or exceptionally good memory. If we could discover the special potential in autistic children and develop their skills effectively, autistics could also be important for the success of the national workforce.

Nevertheless, the number of specialists experienced in therapeutic interventions for autistic children is still insufficient. The more therapeutic sessions children with autism attend, the better their chance of improvement.

Autism specialists suggest that parents and caretakers should also learn how to independently conduct therapeutic activities at home on an ongoing basis so that the therapy is more effective. However, it can be difficult for parents and caregivers to manage their own emotions when being around children with impaired communication and social interaction skills. Due to problems with social interaction, specialists and parents of autism patients may feel tired, frustrated and depressed. Parents' and caregivers' expression of such negative feelings could adversely affect the child's development and desire to engage in social interaction even more. These problems motivate the idea of using robots to assist in therapeutic interventions since robots have no negative feelings or emotion.

The robot disclosed herein is designed to be a friendly toy to play games with autistic children and parents. An autistic child user will learn the rules from play and learn to take turns with another person. Games and activities with the robot can be designed to be suitable to the development of the autistic child. Hence, an autistic child can learn both content knowledge and how to accept and obey social rules at the same time.

Toys have been developed to assist in child development. The inventors of several toys have filed patent applications. For example, US Pat. Apps. 2009/0203294 and 2008/0113323 describe toys designed for assisting a child's muscle development. And US Pat. App. 2007/0172802 describes a toy designed for improving infants' ability to hear sounds.

Robotic toys or semi-automatic devices for children include US Pat. App. 2015/0111185, which is a toy doll that can automatically respond with sounds and facial expression in order to teach children about emotion and social interaction. Both US Pat. App. 2014/0295731 and U.S. Pat. No. 7,446,664 introduce designs of toys that not only express semi-automatic responses but also track the location of the child through wireless communication. The tracking feature could be very useful when caretakers cannot find the child. There are also toy inventions that can operate on many platforms, i.e. U.S. Pat. No. 8,702,515 discloses a toy that can send data to a receiver via RFID tag so that children can learn and do various activities with the toy. However, these toys were designed for neurotypical children.

Several research studies attempt to employ robotic toys as a medium for improving learning skills for autistic children. The research results support the usefulness of robots in improving development in autistic children as shown in the following publications:

Werry, I., Dautenhahn, K. and Harwin, W., 2001, "Evaluating the Response of Children with Autism to a Robot", In Proceedings of Rehabilitation. Engineering and Assistive Technology Society of North America (RESNA 2001), June 22-26;

Dautenhahn, K., Werry, I., Salter, T. and te Boekhorst, R., 2003, "Towards Adaptive Autonomous Robots in Autism Therapy: Varieties of Interactions", In Proceedings of IEEE International Symposium on Computational Intelligence in Robotics and Automation (CIRA '03), July 16-20, Kobe, Japan, pp. 577-582; and Joshua, J. D., Lauren, M. S., Lauren, M. S. and Charles, R. C., 2012, "The Clinical Use of Robots for Individuals with Autism Spectrum Disorders: A Critical Review", Research in Autism Spectrum Disorders, Chicago, Ill., USA, pp. 249-262. By analyzing the number of times autistic children express interest, via looking and touching, it was found that autistic children paid interest to and interacted with robots more than other toys. The results also showed that autistic children were not afraid of robots. With these positive research findings, robots have been increasingly employed in research on training and developing various skills in autistic patients. Robots used for this purpose can be divided into two types: humanoid robots and toy-like robots.

Humanoid robots appear similar to humans. They may express a human voice and perform physical actions, i.e. facial expressions, hand gestures and body movement. Autistic children can learn by imitating the robot' expressions. One humanoid robot, called Robota, was described by Dautenhahn and Billard in 2002, in "Games Children with Autism can Play with Robota, a Humanoid Robotic Doll", In Proceedings of the 1st Cambridge Workshop on Universal Access and Assistive Technology (CWUAAT) (incorporating 4th Cambridge Workshop on Rehabilitation Robotics), March, Cambridge, United Kingdom. and in "Building Robota, a Mini-Humanoid Robot for the Rehabilitation of Children with Autism", RESNA Assistive Technology Journal, Vol. 19. Robota can express a facial expression very similar to humans' facial expressions so it is suitable for training autistic children to look people in their eyes and learning expressions related to emotions.

Another example of a humanoid robot is Milo developed by Hanson Robotics® is Milo, described in Costa, S., 2014, "Robots as Tools to Help Children with ASD to Identify Emotions", Autism 4: e120. Milo is humanoid robot that can express facial expression through modeled facial muscles similar to humans'. It is so that Milo can demonstrate the correct way to pronounce words in order to improve verbal communication skills for autistic children.

In addition, NAO, a commercial humanoid robot by Aldebaran Robotics, is designed for autism interventions at home. NAO has a 58-centimeter height, is portable, and can be conveniently used in various situations. NAO has many joints so it can perform body movement similar to the way humans move. Hence, NAO is suitable for teaching body movement to children with autism. Aldebaran Robotics has provided intervention activities that NAO can lead for autistic children. NAO can recognize faces and voices, making the communication between NAO and autistic patients as realistic as possible. However, NAO cannot perform sentiment analysis or display facial expressions similar to humans, nor does NAO allow for a therapist or caregiver to telemonitor a child user.

One example of a toy-like robot is Paro®, which is cuddly seal-like robot developed by National Institute of Advanced Industrial Science and Technology, Japan and described in Rabbitt, S. M, Kazdin, A. E. and Scassellati, B., 2015, "Integrating socially assistive robotics into mental healthcare interventions: Applications and recommendations for expanded use", Clinical Psychology Review, Vol. 35 pp. 35-46. Paro® was originally introduced for rehabilitation but later used as animal therapy for patients, including autistic patients. With Paro®, the autistic patients feel relaxed and learn to control muscle use. The animal-like appearance of Paro® is more friendly than that of humanoid robots.

Another example of a toy-like robot is Romibo® developed by Origami Robotics®. Romibo® is a fluffy doll-like robot that can move with two wheels and can interactively lead the activities for children. Game activities could be selected to be suitable for patients. Autistic patients can interact with Romibo® through a tablet or computer. Romibo® may encourage or persuade autistic patients to do activities as instructed.

As described above, humanoid robots and toy-like robots have different characteristics, strengths and weaknesses. Nevertheless, there remain other concerns for developing robots for autistic children. On one hand, the design of humanoid robots requires a large number of motors and joints in order to allow human-like movement. The greater number of joints can lead to higher production costs. In addition, joints are usually fragile points that can break when autistic children play with the robots. On the other hand, the design of toy-like robots can allow more limited movement and limited formats for therapeutic activities. Thus, a sturdy, non-jointed, robot capable of a wide range of movement, with lower production costs and options for multiple formats of therapeutic activities is needed.

SUMMARY OF THE INVENTION

This invention aims to assist learning development in intellectual and social aspects for both normal children and autistic children. An automatic mobile robot with toy-like appearance and the ability to express more friendly and non-threatening facial expressions than humanoid robots is disclosed herein. The robot employs sensing units and actuators to create a customized emotional response for interacting with each child without negative emotional expression which could make that child fear and not interact with the robot or caregivers. The robot plays a role in orchestrating games or therapeutic activities for one child or many children playing together. The games or therapeutic activities can be set so that they are suitable for the developmental level of the participating children. During the games or therapeutic activities, child users will learn content knowledge, emotional expression, and how to control themselves by following the rules of the games or therapeutic activities. In the games or therapeutic activities for multiple players, children will learn social skills related to interacting with others and to respect each other's turn.

The robot disclosed herein is designed so that it is not easy to damage during child's play. The robot has two wheels that allow the robot to move even on rough surfaces with small obstacles. Consequently, this robot may be used in hospitals, institutions or homes. The robot's locomotion allows more diverse therapeutic activities to be employed. The robot can integrate with other accessories such as RFID cards, wireless remote controls, and the like. The accessories allow greater variation of games and therapeutic activities to be created and employed suitably for children in different levels of learning development. The activities can be created as software applications and then uploaded to the robot's internal memory. The robot system disclosed herein can be used as an assistive tool for learning development.

DISCLOSURE OF THE INVENTION

Figure 1:
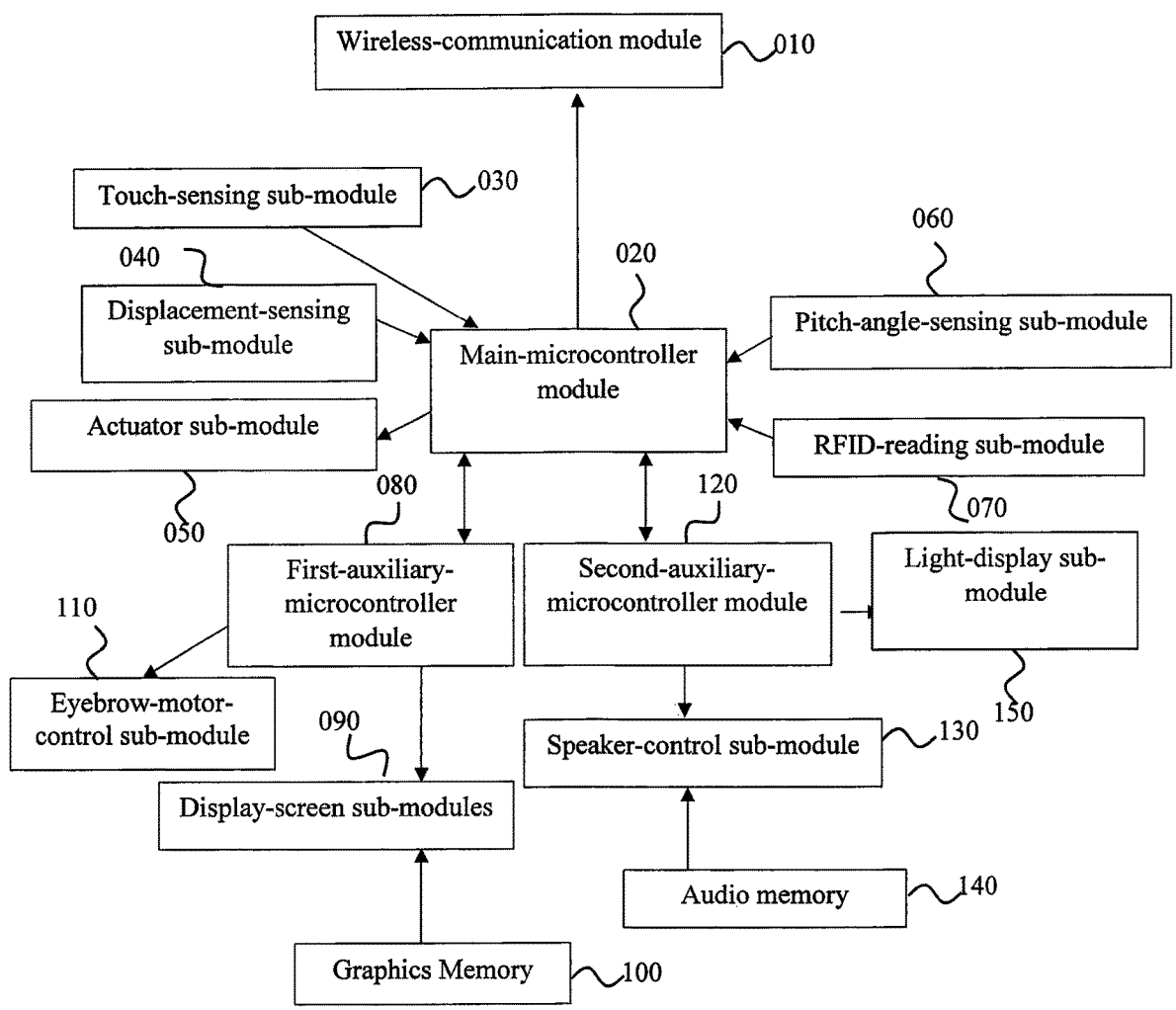
FIG. 1 shows one embodiment of the robot and relationships among parts.
Figure 2:
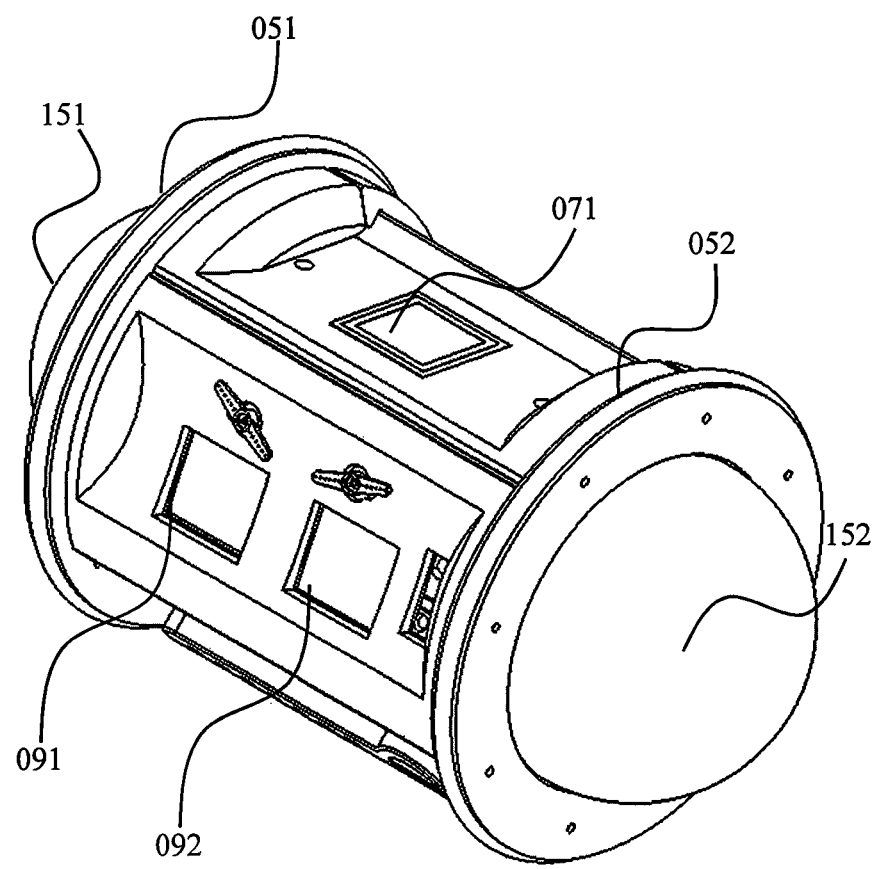
FIG. 2 shows a top perspective of the robot and a front perspective of the robot.
Figure 2:
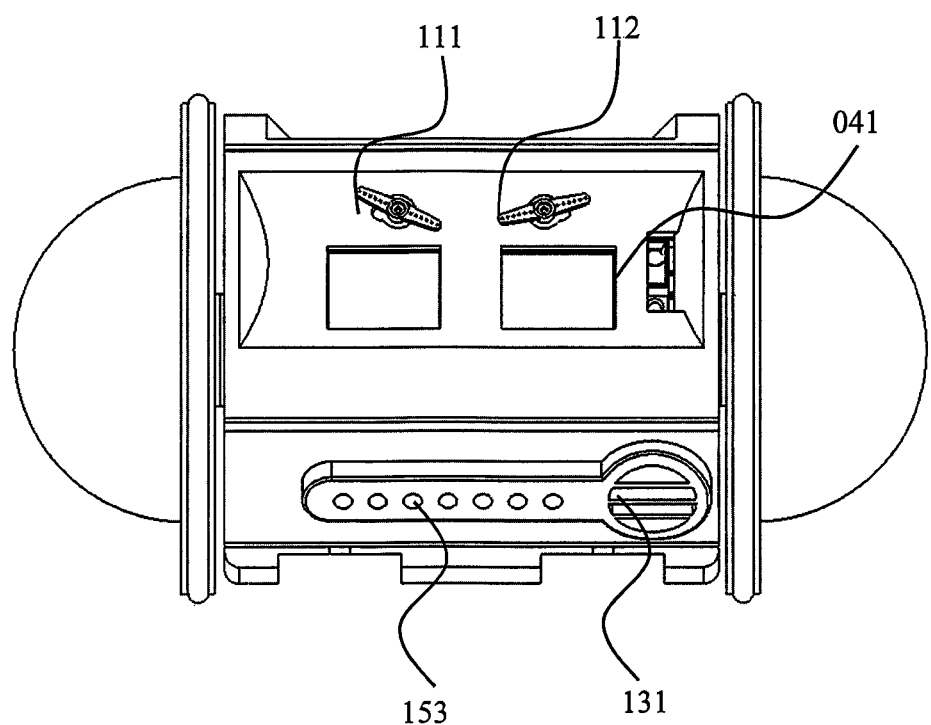

FIGS. 1 and 2 illustrate one implementation of the robot including the wireless controller module (010) for sending and receiving commands between the robot and its accessories, and multiple microcontroller modules for controlling different parts of the robot as follows:

The main-microcontroller module (020) is the central processor of the robot. It receives data from various sensing units in the robot, processes the data, and sends commands to other modules. The sensing units include at least one touch-sensing sub-module (030) located on the robot body for detecting contacts from children, at least one displacement-sensing sub-module (040) located in front of the robot for detecting any obstacles, at least one pitch-angle-sensing sub-module (060), and an RFID-reader (071) located on the top of the robot. An actuator sub-module (050) controls the wheels (051) and (052) based on the robot's locomotion and the detected the angular pitch deviating from level from pitch-angle-sensing sub-module (060) so that the movement of the robot is smooth and balanced. An RFID-reading sub-module (070) detects RFID accessories used by a child user to interact with the robot during selected activities. RFID-reader (071) can be located on the top and/or bottom of the robot.

The main-microcontroller module (020) stores at least one command set to control the display-screen sub-modules (090), at least one eyebrow-motor-control sub-module (110), actuator sub-module (050), speaker-control sub-module (130) and light-display sub-module (150). A first-auxiliary-microcontroller module (080) receives commands from the main-microcontroller module (020) in order to control the display-screen sub-modules (090) and the eyebrow-motor-control sub-modules (110). The display-screen sub-modules (090) retrieve images from graphics memory (100) to display on the screens (091) and (092) located on the front of the robot. The eyebrow-motor-control sub-modules (110) control the motor parts representing eyebrows (111, 112) which are located on the front of the robot. In response to commands from the eyebrow-motor-control sub-modules (110), the eyebrow parts (111, 112) can move in various ways to create facial expression for different emotions.

A second-auxiliary-microcontroller module (120) receives commands from the main-microcontroller module (020) in order to control the speaker-control sub-module (130) and the light-display sub-module (150). The speaker-control sub-module (130) retrieves sound records from audio memory (140) and directs the sound records to play on the speaker (131). The light-display sub-module (150) controls the lights (LEDs 151, 152) located in the transparent plastic domes on each side of the robot and LEDs (153) located on the mid-front of the robot so that the LEDs (151, 152, 153) display colored lights in patterns associated with different emotions of the robot.

The external devices can be chosen from, but are not limited to, computers, remote controls, tablets and smartphones.

The operation of the robot can be described as follows:

The robot has two wheels for balanced locomotion with a movement balance system that limits forward and backward rotation of the robot body so that the top of the robot faces substantially upward by using data from the pitch-angle-sensing sub-module (060). During moving, the robot detects any obstacle in its way with the displacement-sensing sub-module (040).

External devices can be used to control the robot and set programs of activity via wireless-communication module (010).

The robot has a touch-sensing sub-module (030) configured to track the touch pattern on the robot and, based on the pattern detected, process emotional responses for the robot. In other words, the touch-sensing sub-module (030) determines the robot's emotional response and send commands to the main-microcontroller module (020) to display affective signals comprising the determined emotional response.

The robot has the RFID-reading sub-module (070) for detecting activities through RFID accessories. This allows the robot to engage in a variety of interactive games and activities.

The robot has two display-screen sub-modules (090) for displaying images involved in activity programs and for displaying images of different eyes in cooperation with the eyebrow-motor-control sub-modules (110) to indicate facial expression associated with different emotions.

The robot has speaker-control sub-module (130) and display-screen sub-modules (150) for playing sounds and emitting lights, respectively, according to the selected activity programs. Sub-modules (130) and (150) can also be used to exhibit different emotions.

The programs and commands in the main-microcontroller module (020), the first-auxiliary-microcontroller module (080) and the second-auxiliary-microcontroller module (120) can be modified and/or supplemented.

FIG. 2 shows the appearance of the robot. The main structural elements of the robot are made of aluminum and stainless steel. Plastic and acrylic are used on exterior of the robot for decorative purposes.

Previously, robots that have been used for therapeutic development of autistic children were mostly designed to look like humans, exhibit gestures, play sounds and display images on a screen in order to interact with the child users. Most of the previously disclosed robots have limited locomotion and movement capabilities. Previous robots also have a weak point in that, if the robots fall they cannot get up by themselves but need additional help from the user or parts outside of the robot's basic locomotion system. In this invention, the robot is designed with the horizontal, capsule-like, substantially cylindrical shape shown in FIG. 2 and a movement balance system using the pitch-angle-sensing sub-module (060) to balance the robot and limit rotation so that the robot will not rotate too much to the front or back. This design allows the robot disclosed herein to move around more freely on its two wheels while keeping the top portion of the robot's body facing substantially upwards. Even if the robot disclosed herein is placed in a face down position, the robot will be able to right itself using the movement balance system based on input from the pitch-angle-sensing sub-module (060).

The robot has a system for indicating eyes and eyebrows with display-screen sub-modules (090) and eyebrow-motor-control sub-modules (110) respectively so that the robot can exhibit facial expression corresponding to different emotions while interacting with children. The robot is equipped with touch-sensing sub-module (030). When the children touch the robot, the robot detects the touch pattern, analyzes interaction pattern, and selects a suitable robot emotion for responding to the children based on the robot's internal processes. For example, in the case where the child pats the robot softly, the robot will analyze and respond to this touch pattern with a happy emotional response by displaying eyes and eyebrows corresponding to smile, emitting colorful light associated with happiness, and playing cheerful sound. However, if the child hits the robot hard, the robot will analyze and respond with a fearful emotional response by displaying eyes and eyebrows corresponding to a pattern indicating fear, playing fearful sound, and moving away from the child. The robot includes RFID technology for use with the designed applications that can promote child development.

In an experiment with a group of autistic children, it was found that autistic children interacted with the robot well. The operational functions of the robot, including locomotion, sound playing, light display, eyebrow movement, and images shown on screens, helped draw attention of autistic children and bring about more interactions. During the experiment, it was observed that autistic children responded to the robot's stimulating actions by looking at the robot and/or reaching for the robot. The experiment found no sign of fear toward the robot. In some cases, autistic children touched the robot. In one special case, an autistic child, who had difficulty with verbal expression, talked to the robot while playing the selected game with the robot. These results indicate that the robot attracts attention from autistic children and is useful for therapeutic activities for autistic children. The researchers employed all the operational functions of the robot in the development of robot-led therapeutic activities for autistic children. The operational functions of the robot can be integrated and used in a variety of therapeutic activities designed for autistic children.

During the experimentally observed activity, which was a picture matching game, it was found that autistic children could learn the rules to play with the robot well. Moreover, some special characteristics that have never been observed in usual therapeutic session with specialists were observed during the experiment as well; some autistic children developed a strategy to play the game e.g. looking for pictures nearby first and then further, and separating pictures into groups and then looking for the new picture faster. These special characteristics showed that some autistic children could benefit more from playing with the robot usual therapeutic session with specialists. This may be due to the fact that the robot can freely move around, has features that can draw attention from autistic children, and can exhibit facial expression to a degree that is non-threatening to autistic children.

This robot includes other inventive features that allow good performance as follows:

The design of a two-wheeled robot that requires a movement balance system to control the balance of the robot so that it will not rotate around its horizontal axis. In addition, the movement balance system provides a counter force for the motors so that they can overcome the stationary friction force and ensures that the robot will face up in the required angle.

The robot uses various sensing units to detect interaction from the children playing with the robot and, based on the data detected, process emotional responses for the robot to use while interacting with the children.

Finally, the design of the robot's systems is divided into multiple modules; hence, only requiring microcontrollers that require low computational resources to control each of the robot's systems.

An automatic mobile robot for facilitating activities to improve child development is disclosed. The robot has a main-microcontroller module (020) that controls the robot, sends and receives data to and from components, and distributes data to other systems. Components include a pressure or touch-sensing sub-module (030) for detecting touch on the robot via at least one touch sensor attached to the robot, a displacement-sensing sub-module (040) for detecting obstacles in front of the robot via a displacement sensor (041) on the front of the robot, an actuator sub-module (050) for controlling wheels (051, 052) and movement of the robot in cooperation with a pitch-angle-sensing sub-module (060) which performs self-balancing functions to keep the movement of the robot balanced with the top of the robot facing up, and a RFID-reading sub-module (070) for detecting RFID tags on objects, such as cards. In some implementations, the robot has an actuator sub-module (050) that controls a motor for each of the wheels (051, 052) on opposite ends of the capsule-like robot, thereby allowing the robot to move. This is also called the robot's locomotion capability. In some implementations, RFID-reading sub-module (070) includes at least one RFID reader located on the robot for detecting RFID codes from any object with an RFID tag. In some implementations, the touch-sensing sub-module (030) detects touch on the robot and sends the touch detection data to the main-microcontroller module (020) in order to analyze the touch patterns and select the emotional response of the robot based on the touch detection data and touch patterns.

The robot includes a first-auxiliary-microcontroller module (080) that receives commands from the main-microcontroller module (020) to control display-screen sub-modules (090) that retrieve data from the graphics memory (100) to be shown on the display screens (091, 092). The first-auxiliary-microcontroller module (080) also controls the eyebrow-motor-control module (110) that controls the eyebrows (111, 112) attached to the front of the robot. In some implementations, the display-screen sub-modules (090) comprise the display screens (091, 092) for displaying graphics. The display screens (091, 092) are located on the front face of the robot.

A second-auxiliary-microcontroller module (120) receives commands from the main-microcontroller module (020) for controlling the speaker-control sub-module (130) that retrieves sound records from the audio memory (140) in order to play selected sounds on a speaker and control a light-display sub-module (150) to display colored lights and affective signals of the robot, where the affective signals consist of displaying LED colors through transparent acrylic domes (151, 152), via LEDs (not shown) located inside the domes (151, 152) on each side of the wheels (051, 052), and via LEDs (153) attached to the body of the robot. The main-microcontroller module (020) includes command sets to express emotion for the robot via affective signals according to commands from the display-screen sub-modules (090), the eyebrow-motor-control sub-module (110), the actuator sub-module (050), the speaker-control sub-module (130), and the light-display sub-module (150). In some implementations, the robot includes a wireless-communication module (010) configured to communicate with an external wireless communications device so that the external device can send commands to the robot and receive data responses from the robot. The main-microcontroller module (020) may be configured to receive commands from and send a response through the wireless-communication module (010). In some implementations, the wireless-communication module (010) is also configured to communicate with the external device capable of selectively commanding the robot and/or selecting a program to be carried out by the robot. In some implementations, the external device is a wireless communication device selected from a computer, a remote control, a tablet, a smartphone, and any combination thereof.

In some implementations, the robot is shaped cylindrically, substantially like a capsule. In some implementations, the cylindrically shaped robot has an actuator sub-module (050) that controls a motor for each of the wheels (051, 052) on opposite ends of the capsule-like robot, thereby allowing the robot to move. This is also called the robot's locomotion capability. In some implementations, the RFID-reading sub-module (070) of the cylindrically shaped robot includes at least one RFID reader located on the robot for detecting RFID codes from any object with an RFID tag. In some implementations, the display-screen sub-modules (090) comprise the display screens (091, 092) for displaying graphics. The display screens (091, 092) are located on the front face of the cylindrically shaped robot. In some implementations, the touch-sensing sub-module (030) detects touch on the cylindrically shaped robot and sends the touch detection data to the main-microcontroller module (020) in order to analyze the touch patterns and select the emotional response of the robot based on the touch detection data and touch patterns. In some implementations, the robot includes a wireless-communication module (010) configured to communicate with an external wireless communications device so that the external device can send commands to the robot and receive data responses from the cylindrically shaped robot. The main-microcontroller module (020) may be configured to receive commands from and send a response through the wireless-communication module (010). In some implementations, the wireless-communication module (010) is also configured to communicate with the external device capable of selectively commanding the robot and/or selecting a program to be carried out by the cylindrically shaped robot. In some implementations, the external device in communication with the cylindrically shaped robot is a wireless communication device selected from a computer, a remote control, a tablet, a smartphone, and any combination thereof.

As used herein the term "substantially" represents the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

THE BEST WAY TO IMPLEMENT

The methods of using the robot, system, and methods disclosed herein are hereby described.

INDUSTRIAL APPLICATION

The primary objective of the robot disclosed herein is assisting child development for autistic children. The robot can be used as a tool that caregivers use to draw a child's attention to activities or keep children's attention on the activities longer. The robot, system, and methods disclosed herein can also be used by any parents or caregivers who want to use the robot to assist child development.

The invention claimed is:
1. An automated, therapeutic, mobile robot, comprising:
wheels, consisting of a left wheel and a right wheel, each wheel having a diameter equal to a maximum height of the robot;
a sturdy, substantially cylindrical body, substantially disposed between the two wheels and having a maximum body height less than the diameter of the two wheels, and having components including a front face with two display screens situated thereon in positions indicative of eyes, and two actuated eyebrows disposed above the two display screens;
two transparent domes, a left dome disposed outside of the left wheel and a right dome disposed outside of the right wheel, each dome having colored lights therein;
colored lights and a speaker attached to a lower portion of the front face; and
a main-microcontroller module for receiving data from multiple sensing units, processing the data, and sending commands to multiple sub-modules for controlling the sensing units, components of the robot, and motion of the robot,
wherein the sensing units include a touch sensor located on the body of the robot, a displacement sensor located on the front face of the robot, a gyroscope sensor, and an RFID reader,
and wherein the components include the two display screens, the two actuated eyebrows, the colored lights, and the speaker,
and wherein there are at least four sub-modules for controlling components of the robot, configured to send instructions to the components for expressing emotion in response to data received from the sensing units, said emotion is expressed by a combination of a display of eye images on the two display screens, associated motion of the two actuated eyebrows, an associated display pattern of colored lights, and an associated playback of sound on the speaker.

2. The automated, therapeutic, mobile robot of claim 1, wherein the data received from the sensing units includes data received from the touch sensor and the emotion is expressed based on the data received from the touch sensor.

3. The automated, therapeutic, mobile robot of claim 1, wherein the components express emotion customized for a child user.

4. The automated, therapeutic, mobile robot of claim 3, wherein the emotion expressed is customized based on the data received from the sensing units while interacting with the child user.

5. The automated, therapeutic, mobile robot of claim 1, further comprising instructions for the robot to facilitate educational and therapeutic activities.

6. The automated, therapeutic, mobile robot of claim 5, wherein data is collected during the educational and therapeutic activities and the collected data is used for therapeutic analysis.

7. The automated, therapeutic, mobile robot of claim 5, wherein the data received from the sensing units includes data received during at least one of the educational and therapeutic activities and the emotion is expressed based on the data received during at least one of the educational and therapeutic activities.

8. The automated, therapeutic, mobile robot of claim 7, wherein the RFID reader is located on a top portion of the body and further comprising a second RFID reader located on a bottom portion of the body.

9. The automated, therapeutic, mobile robot of claim 8, wherein at least one of the educational and therapeutic activities includes using RFID accessories with at least one of the RFID readers.

10. The automated, therapeutic, mobile robot of claim 1, wherein the sub-modules for controlling the motion of the robot include an actuator sub-module for controlling the wheels based on data received from the gyroscope sensor and the displacement sensor.

11. The automated, therapeutic, mobile robot of claim 10, further comprising a movement balance system configured to provide a counter force so that the wheels can overcome stationary friction, said movement balance system further configured to ensure that a top portion of the body faces substantially upwards.

12. The automated, therapeutic, mobile robot of claim 1, further comprising a wireless-communication module configured to receive data from an external device and send the received data to the main-microcontroller module.

13. An automated, therapeutic system, comprising:
a mobile robot, comprising
two wheels, a left wheel and a right wheel, each wheel having a diameter equal to a maximum height of the robot;
a sturdy, generally cylindrical body, substantially disposed between the two wheels and having a maximum body height less than the diameter of the two wheels, and having components including a front face with two display screens situated thereon in positions indicative of eyes, and two actuated eyebrows disposed above the two display screens;
two transparent domes, a left dome disposed outside of the left wheel and a right dome disposed outside of the right wheel, each dome having colored lights disposed therein;
colored lights and a speaker attached to a lower portion of the front face; and
a main-microcontroller module for receiving data from multiple sensing units, processing the data, and sending commands to multiple sub-modules for controlling the sensing units, components of the robot, and locomotion of the robot,
wherein the sensing units include a touch sensor located on the body of the robot, a displacement sensor located on the front face, a gyroscope sensor, and an RFID reader,
and wherein the components include the two display screens, the two actuated eyebrows, the colored lights, and the speaker,
and wherein there are at least four sub-modules for controlling components of the robot, configured to send instructions to the components for expressing emotion in response to data received from the sensing units, said emotion is expressed by a combination of a display of eye images on the two display screens, associated motion of the two actuated eyebrows, an associated display pattern of colored lights, and an associated playback of sound on the speaker;
an external device for controlling the robot via a wireless-communication module configured to send data to the main-microcontroller module; and
at least one accessory for using with the robot as a part of a therapeutic activity, the accessory selected from RFID accessories, wireless remote controls, and joysticks.

14. The automated, therapeutic system of claim 13, wherein
the sub-modules for controlling the locomotion of the robot include an actuator sub-module for controlling the wheels based on data received from the gyroscope sensor and the displacement sensor; and
wherein the external device is configured to send commands and receive data responses, via the wireless-communication module, for directing the locomotion of the robot and initiating the therapeutic activity.

15. The automated, therapeutic system of claim 14, wherein the external device is selected from a computer, a tablet, a remote control, a smartphone, and any combination thereof and the external device is capable of selectively commanding the robot and selecting a program to be carried out by the robot.

16. A method, performed by a robot, of facilitating activities to improve child development, comprising:
performing a stimulating action with the robot, the robot having two actuated eyebrows disposed above two display screens, the stimulating action selected from locomotion, playing a sound, moving the two actuated eyebrows, displaying images on the two display screens, displaying colored lights, and any combination thereof;
sensing initial interaction of at least one child user with the robot;
initiating a learning activity program having structured rules and turn-based play wherein players include the at least one child user, the robot, and a tertiary user;
detecting interaction of the at least one child user with the robot; and
based on the detected interaction, processing emotional responses of the robot wherein the emotional response is expressed by a combination of a display of eye images on each of the two display screens on the robot, associated motion of the two actuated eyebrows above the two display screens, an associated display pattern of colored lights from the robot, and an associated playback of sound on a speaker on the robot.

17. The method of claim 16, wherein the stimulating action is a greeting including a positive emotional display comprising a combination of a display of eye images on the two display screens, associated motion of the two actuated eyebrows, an associated display pattern of the colored lights, and an associated playback of sound.

18. The method of claim 17, wherein the greeting includes locomotion.

19. The method of claim 16, wherein detecting interaction of the at least one child user with the robot comprises
detecting touch on the robot using a touch-sensing sub-module including a touch sensor located on the body of the robot, and
sending detected touch data from the touch-sensing sub-module to a main-microcontroller module, wherein the main-microcontroller module analyzes the detected touch.

20. The method of claim 19, wherein processing emotional responses of the robot includes analyzing touch patterns and selecting a corresponding emotional response of the robot based on the touch patterns.

* * * * *